US012776437B2

(12) United States Patent
Shiga et al.

(10) Patent No.: US 12,776,437 B2
(45) Date of Patent: Oct. 27, 2026

(54) MULTILAYER COIL COMPONENT

(71) Applicant: TDK CORPORATION, Tokyo (JP)

(72) Inventors: Yuto Shiga, Tokyo (JP); Kazuya Tobita, Tokyo (JP); Youichi Kazuta, Tokyo (JP); Yuichi Takubo, Tokyo (JP); Toshinori Matsuura, Tokyo (JP); Junichiro Urabe, Tokyo (JP); Noriaki Hamachi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 869 days.

(21) Appl. No.: 17/969,223

(22) Filed: Oct. 19, 2022

(65) Prior Publication Data

US 2023/0130960 A1 Apr. 27, 2023

(30) Foreign Application Priority Data

Oct. 22, 2021 (JP) ................................. 2021-173037

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01); *H01F 2027/2809* (2013.01)

(58) Field of Classification Search
CPC .......... H01F 38/023; H01F 7/06; H01F 17/04; H01F 2017/0066; H01F 2017/065; H01F 41/205; H01F 38/00; H01F 27/2804; H01F 27/292; H01F 2027/2809; H01F 17/0013
USPC .................................................. 336/200, 232
See application file for complete search history.

(56) References Cited

U.S. PATENT DOCUMENTS

| | | | | |
|---|---|---|---|---|
| 9,502,170 | B2 * | 11/2016 | Odahara | H01F 27/29 |
| 11,482,365 | B2 * | 10/2022 | Shiga | H01F 17/02 |
| 2020/0357565 | A1 * | 11/2020 | Li | H01F 27/29 |
| 2020/0365312 | A1 * | 11/2020 | Kim | H01F 27/292 |
| 2021/0065951 | A1 | 3/2021 | Arai | |
| 2021/0210274 | A1 * | 7/2021 | Annen | H01F 41/041 |

FOREIGN PATENT DOCUMENTS

| | | | | |
|---|---|---|---|---|
| JP | H08-64421 | A | 3/1996 | |
| JP | 2007329411 | A * | 12/2007 | |
| JP | 2017-011256 | A | 1/2017 | |
| JP | 2017-092447 | A | 5/2017 | |
| JP | 2021-036569 | A | 3/2021 | |
| KR | 102139183 | B1 * | 7/2020 | H01F 41/042 |

OTHER PUBLICATIONS

Apr. 28, 2026 Office Action issued in Japanese Patent Application No. 2025-13588.

* cited by examiner

*Primary Examiner* — Shawki S Ismail
(74) *Attorney, Agent, or Firm* — Oliff PLC

(57) ABSTRACT

A multilayer coil component includes an element body including a main surface, a coil disposed in the element body, and an external electrode electrically connected to the coil. The external electrode includes an underlying metal layer disposed on the element body and a plated layer in contact with a surface of the underlying metal layer. The underlying metal layer includes a main surface electrode portion exposed from the main surface. At least one recess that opens to at least a surface of the main surface electrode portion is formed in the main surface electrode portion.

20 Claims, 8 Drawing Sheets

MULTILAYER COIL COMPONENT

BACKGROUND OF THE INVENTION

1. Field of the Invention

The present disclosure relates to a multilayer coil component.

2. Description of Related Art

Known multilayer coil components include an element body including a main surface arranged to constitute a mounting surface, a coil disposed in the element body, and a pair of external electrodes electrically connected to the coil (for example, see Japanese Unexamined Patent Publication No. 118-64421). Each of the pair of external electrodes includes an underlying metal layer disposed on the element body and a plated layer in contact with a surface of the underlying metal layer.

SUMMARY OF THE INVENTION

According to an aspect of the present disclosure, there is provided a multilayer coil component that improves bonding strength between an underlying metal layer and a plated layer.

A multilayer coil component according to one aspect of the present disclosure includes an element body including a main surface arranged to constitute a mounting surface, a coil disposed in the element body, and a pair of external electrodes electrically connected to the coil. Each of the pair of external electrodes includes an underlying metal layer disposed on the element body and a plated layer in contact with a surface of the underlying metal layer. Each of the pair of external electrodes includes a main surface electrode portion exposed from the main surface. At least one recess that opens to at least the surface is formed in the underlying metal layer included in each main surface electrode portion.

In the one aspect, the plated layer is in contact with the surface of the underlying metal layer included in the main surface electrode portion. The plated layer is in contact with a surface of the at least one recess described above. A contact area between the plated layer and the underlying metal layer in the one aspect is larger than a contact area between the plated layer and the underlying metal layer in a configuration in which the recesses are not formed in the underlying metal layer included in the main surface electrode portion. Therefore, the one aspect improves bonding strength between the underlying metal layer and the plated layer.

In the one aspect, the pair of external electrodes may be separated from each other. A longitudinal direction at an opening of the at least one recess may be a direction in which the pair of external electrodes are separated from each other.

In the configuration in which a longitudinal direction at an opening of the at least one recess is a direction in which the pair of external electrodes are separated from each other, the plated layer includes a portion in contact with a surface of the at least one recess of which the longitudinal direction is the direction in which the pair of external electrodes are separated from each other. The longitudinal direction of this portion is the direction in which the pair of external electrodes are separated from each other. Therefore, in the present configuration, the bonding strength between the underlying metal layer and the plated layer is further improved in a direction which intersects with the direction in which the pair of external electrodes are separated from each other and is along the main surface.

In the one aspect, the element body may include a pair of side surfaces opposing each other and adjacent to the main surface. Each of the pair of external electrodes may include a side surface electrode portion exposed from a corresponding side surface of the pair of side surfaces. At least one recess that opens to at least the surface may be formed in the underlying metal layer included in each side surface electrode portion.

In the configuration in which at least one recess is formed in the underlying metal layer included in each side surface electrode portion, the plated layer is in contact with the surface of the at least one recess formed in the underlying metal layer included in the main surface electrode portion and is in contact with a surface of the at least one recess formed in the underlying metal layer included in the side surface electrode portion. A contact area between the plated layer and the underlying metal layer in the present configuration is larger than a contact area between the plated layer and the underlying metal layer in a configuration in which at least one recess is not formed in the underlying metal layer included in the side surface electrode portion. Therefore, the present configuration further improves the bonding strength between the underlying metal layer and the plated layer.

In the one aspect, a longitudinal direction of an opening of the at least one recess formed in the underlying metal layer included in each side surface electrode portion may be a direction orthogonal to the main surface.

In the configuration in which a longitudinal direction of an opening of the at least one recess formed in the underlying metal layer included in each side surface electrode portion is a direction orthogonal to the main surface, the plated layer includes a portion in contact with a surface of the at least one recess of which the longitudinal direction is the direction orthogonal to the main surface. The longitudinal direction of this portion is the direction orthogonal to the main surface. Therefore, the present configuration further improves the bonding strength between the underlying metal layer and the plated layer in the direction along the main surface.

In the one aspect, the main surface electrode portion and the side surface electrode portion may be integrally formed with each other. The at least one recess formed in the underlying metal layer included in the main surface electrode portion and the at least one recess formed in the underlying metal layer included in the side surface electrode portion may be continuous with each other.

In the configuration in which at least one recess formed in the underlying metal layer included in the side surface electrode portion and at least one recess formed in the underlying metal layer included in the main surface electrode portion are continuous with each other, the plated layer in contact with the main surface electrode portion and the plated layer in contact with the side surface electrode portion are continuous with each other. In the present configuration, the plated layer tends not to peel off from the underlying metal layer as compared with a configuration in which the plated layer in contact with the main surface electrode portion and the plated layer in contact with the side surface electrode portion are not continuous with each other. Therefore, the present configuration further improves the bonding strength between the underlying metal layer and the plated layer.

In the one aspect, the at least one recess may include a plurality of recesses.

A contact area between the plated layer and the underlying metal layer in the configuration in which the at least one recess includes a plurality of recesses is larger than a contact area between the plated layer and the underlying metal layer in a configuration in which the at least one recess does not include a plurality of recesses. Therefore, the configuration in which the at least one recess includes a plurality of recesses further improves the bonding strength between the underlying metal layer and the plated layer.

In the one aspect, a recess may be formed in the plated layer at a position corresponding to the at least one recess.

In the configuration in which a recess is formed in the plated layer at a position corresponding to the at least one recess, when the multilayer coil component is solder-mounted, a surface of the recess of the plated layer and a solder come into contact with each other. A contact area between the plated layer and the solder in the present configuration is larger than a contact area between the plated layer and the solder in a configuration in which the recess is not formed in the plated layer at a position corresponding to the at least one recess. Therefore, the present configuration improves bonding strength between the plated layer and the solder. Consequently, the present configuration improves mounting strength of the multilayer coil component.

The present disclosure will become more fully understood from the detailed description given hereinafter and the accompanying drawings which are given by way of illustration only, and thus are not to be considered as limiting the present disclosure.

Further scope of applicability of the present disclosure will become apparent from the detailed description given hereinafter. However, it should be understood that the detailed description and specific examples, while indicating embodiments of the disclosure, are given by way of illustration only, since various changes and modifications within the spirit and scope of the disclosure will become apparent to those skilled in the art from this detailed description.

DETAILED DESCRIPTION OF EMBODIMENTS

Figure 1:
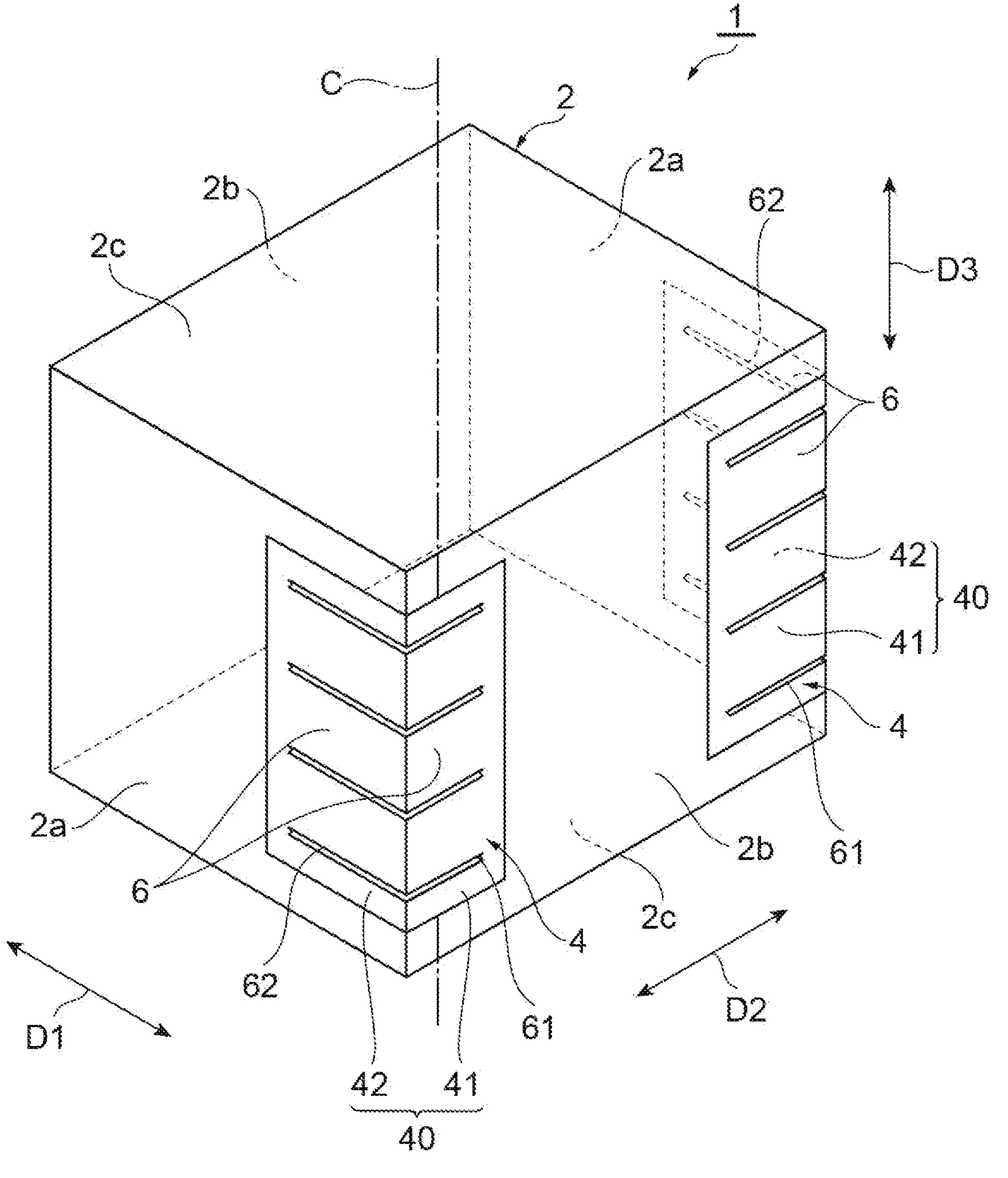
FIG. 1 is a perspective view illustrating a multilayer coil component according to an embodiment.

Hereinafter, embodiments of the present disclosure will be described in detail with reference to the accompanying drawings. In the following description, the same elements or elements having the same functions are denoted with the same reference numerals and overlapped explanation is omitted.

Figure 2:
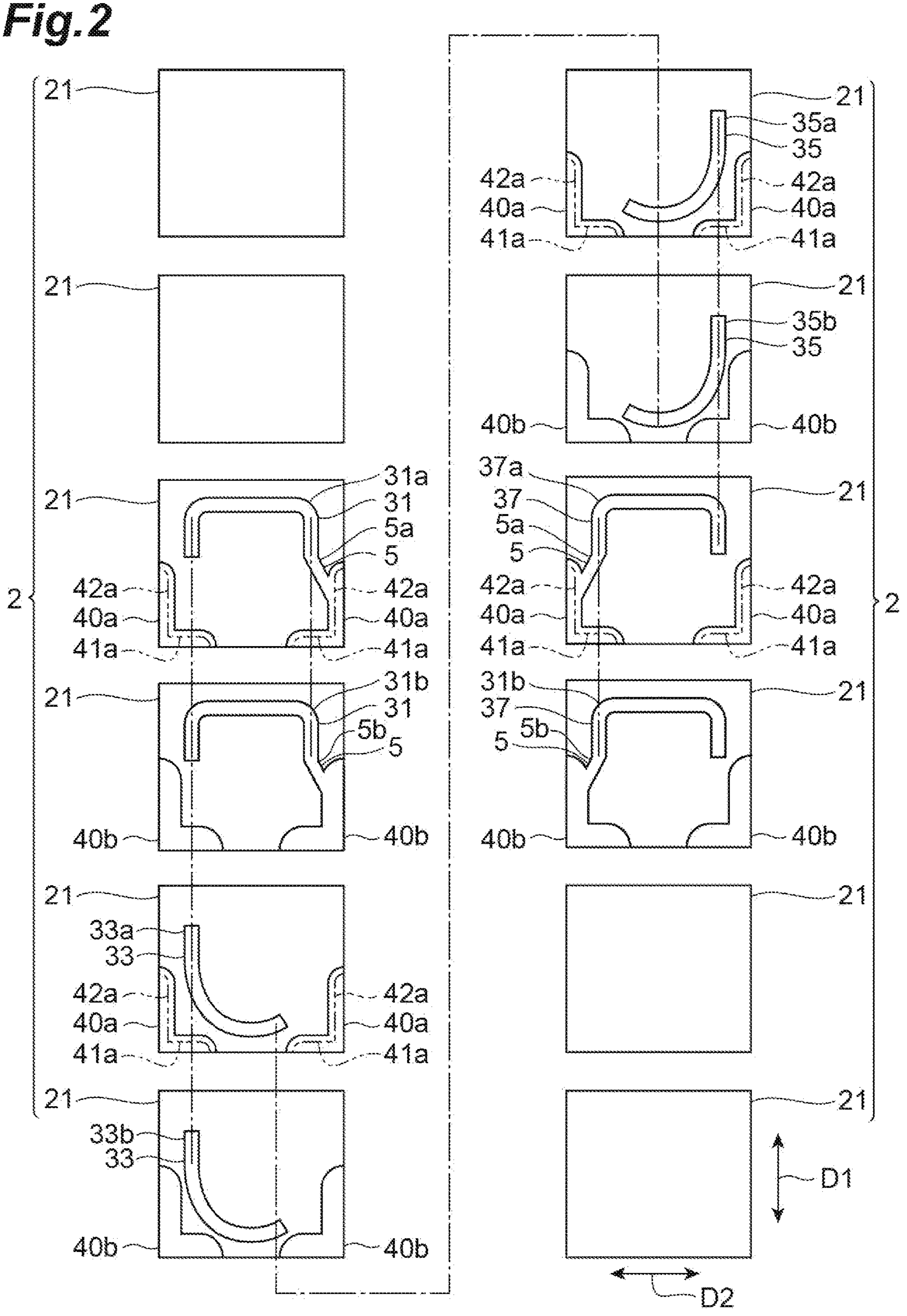
FIG. 2 is an exploded view illustrating the multilayer coil component according to the present embodiment.
Figure 3:
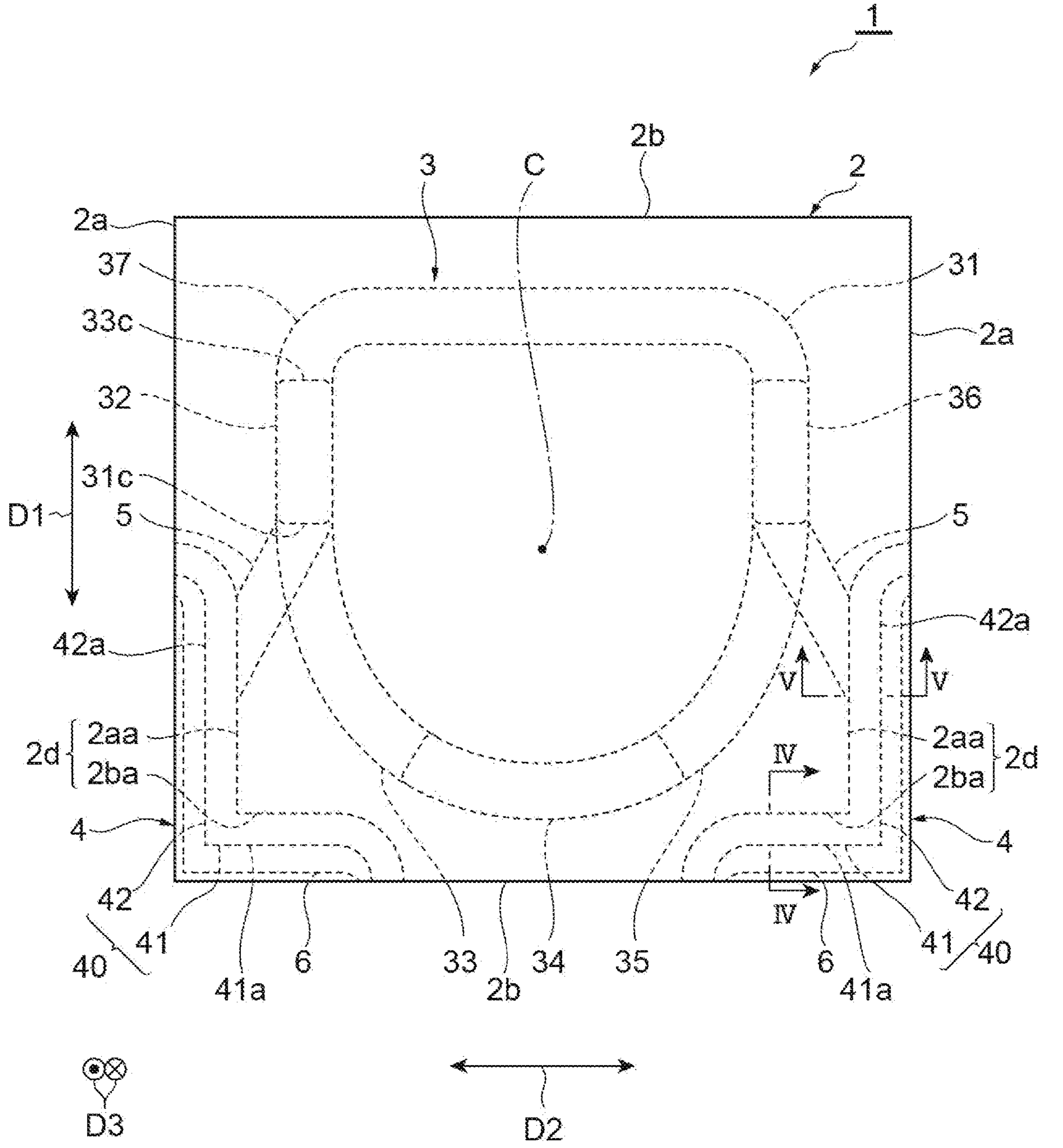
FIG. 3 is a plan view illustrating the multilayer coil component according to the present embodiment.
Figure 4A:
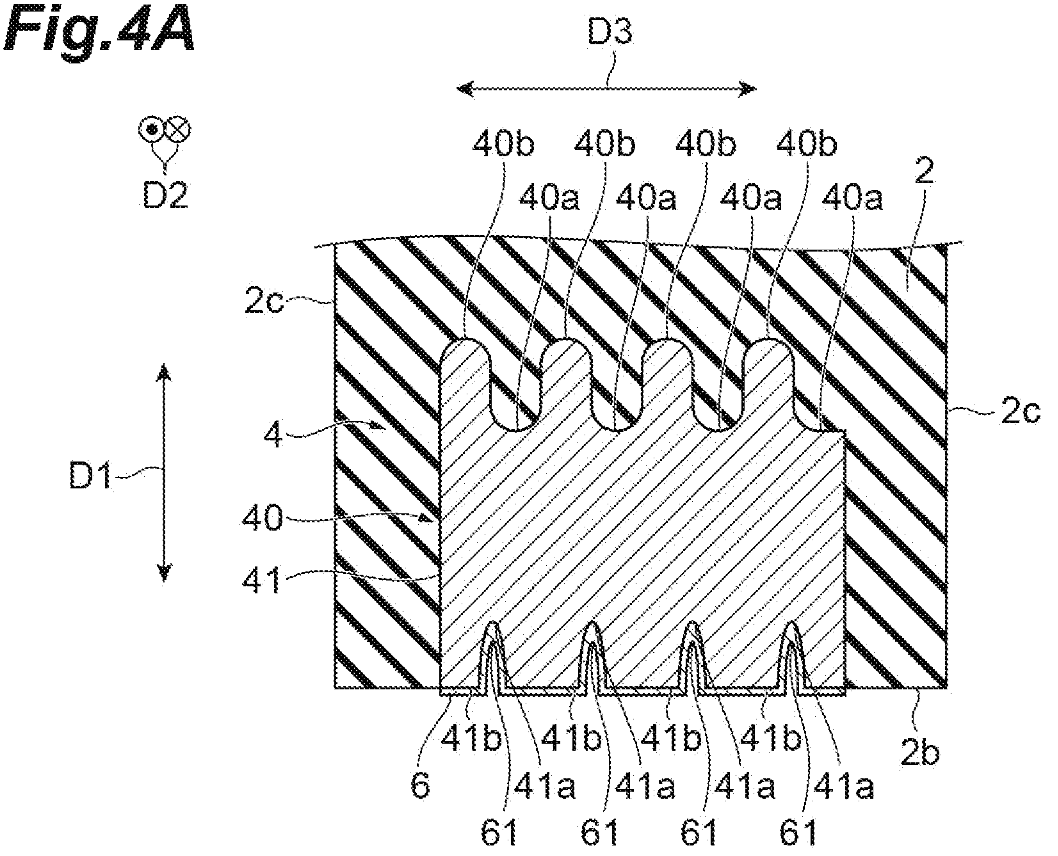
FIGS. 4A and 4B are views each illustrating a cross-sectional configuration of an external electrode.
Figure 4B:
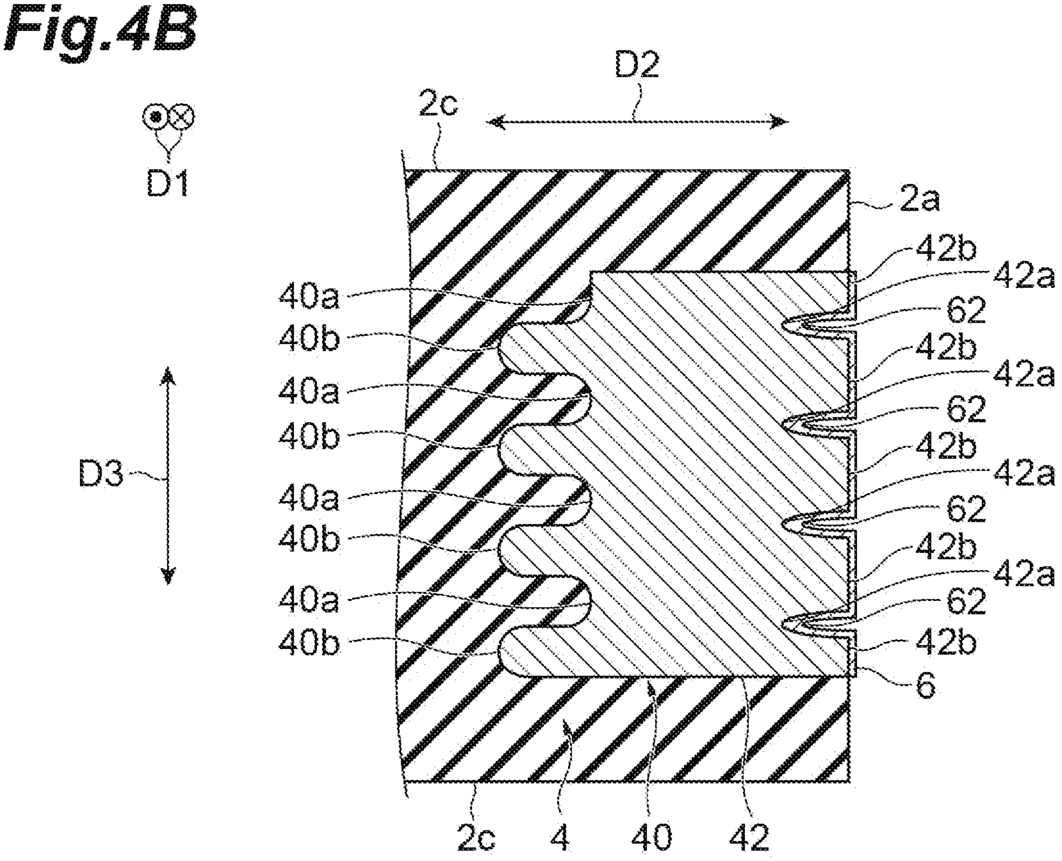

A configuration of a multilayer coil component 1 according to the present embodiment will be described with reference to FIGS. 1 to 4A and 4B. FIG. 1 is a perspective view illustrating the multilayer coil component according to the present embodiment. FIG. 2 is an exploded view illustrating a configuration of the multilayer coil component according to the present embodiment. FIG. 3 is a plan view illustrating the multilayer coil component according to the present embodiment. FIGS. 4A and 4B are views each illustrating a cross-sectional configuration of an external electrode.

The multilayer coil component 1 is solder-mounted in an electronic device. The electronic device includes, for example, a circuit board or an electronic component.

As illustrated in FIGS. 1 to 3, the multilayer coil component 1 includes an element body 2 having a rectangular parallelepiped shape, a coil 3 disposed in the element body 2, a pair of external electrodes 4, and a pair of connection conductors 5 disposed in the element body 2. The rectangular parallelepiped shape may be a shape of a rectangular parallelepiped in which corner portions and ridge portions are chamfered or a shape of a rectangular parallelepiped in which corner portions and ridge portions are rounded.

The element body 2 includes a pair of side surfaces 2*a* opposing each other, a pair of main surfaces 2*b* opposing each other, and a pair of side surfaces 2*c* opposing each other. Each main surface 2*b*, each side surface 2*a*, and each side surface 2*c* have a substantially rectangular shape. The side surface 2*a* and the main surface 2*b* are adjacent to each other. The side surface 2*a* and the side surface 2*c* are adjacent to each other. The side surface 2*c* and the main surface 2*b* are adjacent to each other.

A direction D1 in which the pair of main surfaces 2*b* oppose each other is orthogonal to the main surfaces 2*b*. The direction D1 is orthogonal to a direction D2 in which the pair of side surfaces 2*a* oppose each other. The direction D2 is orthogonal to the side surface 2*a*. A direction D3 in which the pair of side surfaces 2*c* oppose each other is orthogonal to the side surfaces 2*c* and parallel to the side surface 2*a* and the main surface 2*b*. The direction D3 is orthogonal to the direction D1 and the direction D2.

The side surface 2*c* is entirely exposed. One main surface 2*b* of the pair of main surfaces 2*b* includes an exposed region when viewed in the direction D1. Another main surface 2*b* of the pair of main surfaces 2*b* is entirely exposed. A pair of recesses 2*ba* opposing each other in the direction D2 are formed in the one main surface 2*b*. The pair of recesses 2*ba* are positioned at both ends of the one main surface 2*b* in the direction D2 and are recessed in the direction D1. Each of the pair of side surfaces 2*a* includes an exposed region. A recess 2*aa* is formed in each of the pair of side surfaces 2*a*. The recesses 2*aa* formed in the pair of side surfaces 2*a* oppose each other in the direction D2. The pair of recesses 2*aa* are formed in the element body 2. Each recess 2*aa* is positioned at one end of the side surface 2*a* in the direction D1 and is recessed in the direction D2. The recess 2*aa* and the recess 2*ba* constitute a recess 2*d*. A pair of recesses 2*d* are formed in the element body 2. The recesses 2*d* are continuous with each other over the one main surface 2*b* and the one side surface 2*a* and oppose each other in the direction D2. A corresponding external electrode 4 of the pair of external electrodes 4 is disposed in each of the pair of recesses 2*d*. Each of the pair of recesses 2*d* corresponds to the external electrode 4. Bottoms of the pair of recesses 2*d* are not exposed when viewed in the direction D1 and the direction D2.

As illustrated in FIG. 3, each of the pair of external electrodes 4 is disposed in a corresponding recess 2*d* of the pair of recesses 2*d*. The pair of external electrodes 4 are separated from each other in the direction D2. The pair of external electrodes 4 are embedded in the element body 2. The pair of external electrodes 4 have, for example, the same shape. A surface of each external electrode 4 includes a region substantially flush with the side surface 2*a* and a region substantially flush with the main surface 2*b*. In the multilayer coil component 1, the one main surface 2*b* is arranged to constitute a mounting surface facing the electronic device. Each of the pair of external electrodes 4 is electrically connected to the coil 3 and includes an underlying metal layer 40 disposed on the element body 2.

Each of the pair of external electrodes 4 includes a main surface electrode portion 41 exposed from the one main surface 2*b* and a side surface electrode portion 42 exposed from a corresponding side surface 2*a* of the pair of side surfaces 2*a*. The main surface electrode portion 41 is positioned corresponding to the recess 2*ba*. The side surface electrode portion 42 is positioned corresponding to the recess 2*aa*. The main surface electrode portion 41 and the side surface electrode portion 42 are integrally formed with each other. In the present embodiment, the main surface electrode portion 41 and the side surface electrode portion 42 are directly connected to each other. The underlying metal layer 40 including the main surface electrode portion 41 and the side surface electrode portion 42 has a substantially L-shaped cross section when viewed in the direction D3. The main surface electrode portion 41 has a substantially rectangular shape when viewed in the direction D1. The side surface electrode portion 42 has a substantially rectangular shape when viewed in the direction D2.

Each of the pair of external electrodes 4 includes a plated layer 6. A surface of the underlying metal layer 40 is exposed from the element body 2. The plated layer 6 is formed on the surface of the underlying metal layer 40 exposed from the element body 2. The plated layer 6 is in contact with the surface of the underlying metal layer 40. The surface of the underlying metal layer 40 includes a surface of the main surface electrode portion 41 and a surface of the side surface electrode portion 42. The surface of the main surface electrode portion 41 and the surface of the side surface electrode portion 42 are exposed from the element body 2. The surface of the main surface electrode portion 41 and the surface of the side surface electrode portion 42 are in contact with the plated layer 6. The plated layer 6 includes, for example, an electroplated layer or an electroless plated layer. The plated layer 6 includes, for example, Ni, Sn, or Au.

As illustrated in FIG. 2, the element body 2 is configured through laminating a plurality of insulator layers 21. The element body 2 includes the plurality of laminated insulator layers 21. In the present embodiment, the number of the plurality of insulator layers 21 is "12." In the element body 2, a direction in which the plurality of insulator layers 21 are laminated coincides with the direction D3. In the actual element body 2, the insulator layers 21 are integrated with each other to such an extent that each boundary between the insulator layers 21 cannot be visually recognized. Each insulator layer 21 is formed of, for example, a magnetic material. The magnetic material includes, for example, a Ni—Cu—Zn based ferrite material, a Ni—Cu—Zn—Mg based ferrite material, or a Ni—Cu based ferrite material. The magnetic material forming each insulator layer 21 may include an Fe alloy. Each insulator layer 21 may be formed of a nonmagnetic material. The nonmagnetic material includes, for example, a glass-ceramic material or a dielectric material. In the present embodiment, each insulator layer 21 includes a sintered green sheet including a magnetic material.

As illustrated in FIG. 2, the underlying metal layer 40 is configured through laminating a plurality of electrode layers 40*a* and 40*b*. The underlying metal layer 40 includes the plurality of laminated electrode layers 40*a* and 40*b*. The electrode layers 40*a* and 40*b* are alternately laminated. In the present embodiment, the number of each of the plurality of electrode layers 40*a* and 40*b* is "4." The number of the plurality of electrode layers 40*a* and 40*b* is "8." In the underlying metal layer 40, a direction in which the plurality of electrode layers 40*a* and 40*b* are laminated coincides with the direction D3. In the actual underlying metal layer 40, the electrode layers 40*a* and 40*b* are integrated with each other to such an extent that each boundary between the electrode layers 40*a* and 40*b* cannot be visually recognized. Each of the electrode layers 40*a* and 40*b* is disposed in a defective portion formed in a corresponding insulator layer 21 of the plurality of insulator layers 21. The pair of recesses 2*d* of the element body 2 after being fired are obtained from the defective portion formed in each insulator layer 21. Each of the electrode layers 40*a* and 40*b* is formed of, for example, a conductive material. The conductive material includes, for example, Ag or Pd. In the present embodiment, each of the electrode layers 40*a* and 40*b* includes a sintered conductive paste including conductive material powder. The conductive material powder includes, for example, Ag powder or Pd powder.

A size of the electrode layer 40*b* when viewed in the direction D3 is larger than a size of the electrode layer 40*a* when viewed in the direction D3. A portion of the electrode layer 40*b* in contact with the insulator layer 21 protrudes toward the inside of the element body 2 more than a portion of the electrode layer 40*a* in contact with the insulator layer 21. The portion of the electrode layer 40*b* in contact with the insulator layer 21 includes a first portion included in the main surface electrode portion 41 and a second portion included in the side surface electrode portion 42. The first portion protrudes toward the inside of the element body 2 in the direction D1. The second portion protrudes toward the inside of the element body 2 in the direction D2. In the underlying metal layer 40, the plurality of electrode layers 40*a* and the plurality of electrode layers 40*b* are alternately positioned in the direction D3.

As illustrated in FIG. 2, the coil 3 is configured through laminating a plurality of coil conductor layers 31*a*, 31*b*, 33*a*, 33*b*, 35*a*, 35*b*, 37*a*, and 37*b*. The coil 3 includes the plurality of laminated coil conductor layers 31*a* to 37*b*. In the present embodiment, the number of the plurality of coil conductor layers 31*a* to 37*b* is "8." In the coil 3, a direction in which the plurality of coil conductor layers 31*a* to 37*b* are laminated coincides with the direction D3. In the actual coil 3, the plurality of coil conductor layers 31*a* to 37*b* are integrated with each other to such an extent that each boundary between adjacent coil conductor layers 31*a* to 37*b* of the plurality of coil conductor layers 31*a* to 37*b* cannot be visually recognized. Each of the coil conductor layers 31*a* to 37*b* is disposed in a defective portion formed in the corresponding insulator layer 21 of the plurality of insulator layers 21. Each of the coil conductor layers 31*a* to 37*b* is formed of, for example, the same material as each electrode layer 40*a*. Each of the coil conductor layers 31*a* to 37*b* includes, for example, a sintered conductive paste.

As illustrated in FIG. 2, each connection conductor 5 is configured through laminating a plurality of connection conductor layers 5*a* and 5*b*. Each connection conductor 5 includes the plurality of laminated connection conductor layers 5*a* and 5*b*. In the present embodiment, the number of the plurality of connection conductor layers 5*a* and 5*b* in each connection conductor 5 is "2." In each connection conductor 5, a direction in which the plurality of connection conductor layers 5*a* and 5*b* are laminated coincides with the direction D3. In the actual connection conductor 5, the plurality of connection conductor layers 5*a* and 5*b* are integrated with each other to such an extent that a boundary between the connection conductor layers 5*a* and 5*b* cannot be visually recognized. Each of the connection conductor layers 5*a* and 5*b* is disposed in a defective portion formed in the corresponding insulator layer 21 of the plurality of insulator layers 21. Each of the connection conductor layers 5*a* to 5*b* is formed of, for example, the same material as each electrode layer 40*a* and each of the coil conductor layers 31*a* to 37*b*. Each of the connection conductor layers 5*a* and 5*b* includes, for example, a sintered conductive paste.

Each insulator layer 21, each of the electrode layers 40*a* and 40*b*, and each of the connection conductor layers 5*a* and 5*b* are simultaneously fired. When each of the insulator layers 21 is obtained from a green sheet, each of the electrode layers 40*a* and 40*b*, each of the coil conductor layers 31*a* to 37*b*, and each of the connection conductor layers 5*a* and 5*b* are obtained from a conductive paste.

The coil 3 includes an imaginary coil axis C, as illustrated in FIGS. 1 and 3. In the present embodiment, a coil axis direction in which the coil axis C extends coincides with the direction D3. The coil 3 includes a plurality of coil conductors 31, 33, 35, and 37 distributed in the direction D3 and connected to each other. Each of the coil conductors 31 to 37 constitutes a part of an annular path in the coil 3. Each of the coil conductors 31 to 37 has, for example, a shape in which a part of a loop is interrupted. Each of the coil conductors 31 to 37 extends from one end to the other end along the annular path. In the present embodiment, the coil 3 includes four coil conductors 31 to 37 connected to each other in the direction D3. The number of turns of the coil 3 is 1.5 turns.

As illustrated in FIG. 2, the coil conductor 31 is configured through laminating the plurality of coil conductor layers 31*a* and 31*b*. The plurality of coil conductor layers 31*a* and 31*b* are integrated with each other. The coil conductor 31 constitutes one end of the coil 3. The one end of the coil 3 and one external electrode 4 are connected to each other via one connection conductor 5. In the present embodiment, the coil conductor 31, the one external electrode 4, and the one connection conductor 5 are integrally formed with each other. The one end of the coil 3 and the one external electrode 4 are directly connected to each other via the one connection conductor 5. One end of the coil conductor 31 is connected to the one connection conductor 5. Another end of the coil conductor 31 is connected to the coil conductor 33.

The coil conductor 33 is configured through laminating the plurality of coil conductor layers 33*a* and 33*b*. The plurality of coil conductor layers 33*a* and 33*b* are integrated with each other. The coil conductor 33 and the coil conductor 31 constitute a pair of coil conductors 31 and 33 that are adjacent to each other in the direction D3. One end of the coil conductor 33 overlaps and is connected to the other end of the coil conductor 31 in the direction D3. The pair of coil conductors 31 and 33 include portions 32 that overlap each other and are connected to each other in the direction D3. The portions 32 include the other end of the coil conductor 31 and the one end of the coil conductor 33. The portions 32 include the plurality of fired coil conductor layers 31*a*, 31*b*, 33*a*, and 33*b*. In the portions 32, the pair of coil conductors 31 and 33 are electrically and physically connected to each other. The portions 32 are integrated with each other to such an extent that each boundary between the plurality of coil conductor layers 31*a*, 31*b*, 33*a*, and 33*b* cannot be visually recognized. The one end of the coil conductor 33 is connected to the coil conductor 31. The other end of the coil conductor 33 is connected to the coil conductor 35.

The coil conductor 35 is configured through laminating the plurality of coil conductor layers 35*a* and 35*b*. The plurality of coil conductor layers 35*a* and 35*b* are integrated with each other. The coil conductor 35 and the coil conductor 33 constitute a pair of coil conductors 33 and 35 that are adjacent to each other in the direction D3. One end of the coil conductor 35 overlaps and is connected to the other end of the coil conductor 33 in the direction D3. The pair of coil conductors 33 and 35 include portions 34 that overlap each other and are connected to each other in the direction D3. The portions 34 include the other end of the coil conductor 33 and the one end of the coil conductor 35. The portions 34 include the plurality of fired coil conductor layers 33*a*, 33*b*, 35*a*, and 35*b*. In the portions 34, the pair of coil conductors 33 and 35 are electrically and physically connected to each other. The portions 34 are integrated with each other to such an extent that each boundary between the plurality of coil conductor layers 33*a*, 33*b*, 35*a*, and 35*b* cannot be visually recognized. The one end of the coil conductor 35 is connected to the coil conductor 33. The other end of the coil conductor 35 is connected to the coil conductor 37.

The other end of the coil conductor 35 overlaps and is connected to one end of the coil conductor 37 in the direction D3. A pair of coil conductors 35 and 37 include portions 36 that overlap each other and are connected to each other in the direction D3. The portions 36 include the other end of the coil conductor 35 and the one end of the coil conductor 37. The portions 36 include the plurality of fired coil conductor layers 35*a*, 35*b*, 37*a*, and 37*b*. In the portions 36, the pair of coil conductors 35 and 37 are electrically and physically connected to each other. The portions 36 are integrated with each other to such an extent that each boundary between the plurality of coil conductor layers 35*a*, 35*b*, 37*a*, and 37*b* cannot be visually recognized.

The coil conductor 37 is configured through laminating the plurality of coil conductor layers 37*a* and 37*b*. The plurality of coil conductor layers 37*a* and 37*b* are integrated with each other. The coil conductor 37 constitutes another end of the coil 3. The other end of the coil 3 and the other external electrode 4 are connected to each other via the other connection conductor 5. In the present embodiment, the coil conductor 37, another external electrode 4, and another connection conductor 5 are integrally formed with each other. The other end of the coil 3 and the other external electrode 4 are directly connected to each other via the other connection conductor 5. The one end of the coil conductor 37 is connected to the coil conductor 35. The other end of the coil conductor 37 is connected to the other connection conductor 5.

FIGS. 4A and 4B are views each illustrating a cross-sectional configuration of the external electrode.

FIG. 4A illustrates the cross-sectional configuration of the external electrode 4 along line IV-IV illustrated in FIG. 3. FIG. 4A is a view of a cross section obtained by cutting the main surface electrode portion 41 along a plane parallel to the side surface 2*a* in the direction D2. FIG. 4A illustrates a cross-sectional configuration of the main surface electrode portion 41 and the plated layer 6. The plated layer 6 illustrated in FIG. 4A is in contact with a surface 41*b* of the underlying metal layer 40 included in the main surface electrode portion 41.

FIG. 4B illustrates the cross-sectional configuration of the external electrode 4 along line V-V illustrated in FIG. 3. FIG. 4B is a view of a cross section obtained by cutting the side surface electrode portion 42 along a plane parallel to the main surface 2*b* in the direction D1. FIG. 4B illustrates a cross-sectional configuration of the side surface electrode portion 42 and the plated layer 6. The plated layer 6 illustrated in FIG. 4B is in contact with a surface 42*b* of the underlying metal layer 40 included in the side surface electrode portion 42.

As illustrated in FIGS. 3 and 4A, a plurality of recesses 41*a* that open to at least the surface 41*b* are formed in the underlying metal layer 40 included in the main surface electrode portion 41. In the present embodiment, the number of the plurality of recesses 41*a* is "4." The number of the recesses 41*a* may be "1." One recess 41*a* that opens to at least the surface 41*b* may be formed in the underlying metal layer 40 included in the main surface electrode portion 41. Each recess 41*a* is recessed in the direction D1. The direction D3 is a width direction of each recess 41*a*. The direction D2 is a length direction of each recess 41*a*. The direction D1 is a depth direction of each recess 41*a*. An opening width of each recess 41*a* in the direction D2 is greater than an opening width of each recess 41*a* in the direction D3. A longitudinal direction at an opening of each recess 41*a* coincides with the direction D2. Each recess 41*a* is formed in a groove shape with the direction D2 as the longitudinal direction.

As illustrated in FIGS. 3 and 4B, a plurality of recesses 42*a* that open to at least the surface 42*b* are formed in the underlying metal layer 40 included in the side surface electrode portion 42. In the present embodiment, the number of the plurality of recesses 42*a* is "4." The number of the recesses 42*a* may be "1." One recess 42*a* that opens to at least the surface 42*b* may be formed in the underlying metal layer 40 included in the side surface electrode portion 42. Each recess 42*a* is recessed in the direction D2. The direction D3 is a width direction of each recess 42*a*. The direction D1 is a length direction of each recess 42*a*. The direction D2 is a depth direction of each recess 42*a*. An opening width of each recess 42*a* in the direction D1 is greater than an opening width of each recess 42*a* in the direction D3. A longitudinal direction at an opening of each recess 42*a* coincides with the direction D1. Each recess 42*a* is formed in a groove shape with the direction D1 as the longitudinal direction.

In the present embodiment, the number of the plurality of recesses 42*a* is equal to the number of the plurality of recesses 41*a*.

The plated layer 6 is in contact with a surface of each recess 41*a*. The plated layer 6 includes a plurality of portions each of which is in contact with a corresponding recess 41*a* of the plurality of recesses 41*a*, and the plurality of portions have a longitudinal direction in the direction D2. A plurality of recesses 61 are formed in the plated layer 6 on the main surface electrode portion 41 at positions corresponding to the plurality of recesses 41*a*. A longitudinal direction at an opening of the recess 61 coincides with the direction D2. In the present embodiment, the number of the plurality of recesses 41*a* is equal to the number of the plurality of recesses 61.

The plated layer 6 is in contact with a surface of each recess 42*a*. The plated layer 6 includes a plurality of portions each of which is in contact with a corresponding recess 42*a* of the plurality of recesses 42*a*, and the plurality of portions have a longitudinal direction in the direction D1. A plurality of recesses 62 are formed in the plated layer 6 on the side surface electrode portion 42 at positions corresponding to the plurality of recesses 42*a*. A longitudinal direction at an opening of the recess 62 coincides with the direction D1. In the present embodiment, the number of the plurality of recesses 42*a* is equal to the number of the plurality of recesses 62.

Each recess 61 is formed in a groove shape with the direction D2 as the longitudinal direction. Each recess 62 is formed in a groove shape with the direction D1 as the longitudinal direction. The recess 41*a* and the recess 42*a*, which are positioned at the same position in the direction D3, are continuous with each other at a ridge portion of the element body 2. The plated layer 6 in contact with the recess 41*a* and the plated layer 6 in contact with the recess 42*a* are continuous with each other at the ridge portion of the element body 2. The recess 61 and the recess 62, which are positioned at the same position in the direction D3, are continuous with each other at the ridge portion of the element body 2.

As illustrated in FIG. 4A, a plurality of protrusions and a plurality of recesses that are in contact with the element body 2 are formed in the main surface electrode portion 41. Each protrusion in contact with the element body 2 is configured by a corresponding electrode layer 40*b* of the plurality of electrode layers 40*b*. Each recess in contact with the element body 2 is configured by a corresponding electrode layer 40*a* of the plurality of electrode layers 40*a*. Specifically, each recess is configured by the corresponding electrode layer 40*a* and the electrode layers 40*b* adjacent to the corresponding electrode layer 40*a*. The plurality of protrusions and the plurality of recesses formed in the main surface electrode portion 41 are alternately positioned in the direction D3. The protrusion configured by the electrode layer 40*b* is positioned at one end of the main surface electrode portion 41 in the direction D3. The recess configured by the electrode layer 40*a* is positioned at the other end of the main surface electrode portion 41 in the direction D3.

As illustrated in FIG. 4B, a plurality of protrusions and a plurality of recesses that are in contact with the element body 2 are formed in the side surface electrode portion 42. Each protrusion in contact with the element body 2 is configured by a corresponding electrode layer 40*b* of the plurality of electrode layers 40*b*. Each recess in contact with the element body 2 is configured by the corresponding electrode layer 40*a* of the plurality of electrode layers 40*a*. Specifically, each recess is configured by a corresponding electrode layer 40*a* and the electrode layers 40*b* adjacent to the corresponding electrode layer 40*a*. The plurality of protrusions and the plurality of recesses formed in the side surface electrode portion 42 are alternately positioned in the direction D3. The protrusion configured by the electrode layer 40*b* is positioned at one end of the side surface electrode portion 42 in the direction D3. The recess configured by the electrode layer 40*a* is positioned at the other end of the side surface electrode portion 42 in the direction D3.

Each of the recesses 41*a* and 42*a* is formed, for example, between the electrode layer 40*a* and the electrode layer 40*b*. Each recess 41*a* is positioned between a portion of the electrode layer 40*a* constituting the main surface electrode portion 41 and a portion of the electrode layer 40*b* constituting the main surface electrode portion 41. Each recess 42*a* is positioned between a portion of the electrode layer 40*a* constituting the side surface electrode portion 42 and a portion of the electrode layer 40*b* constituting the side surface electrode portion 42. The recess 41*a* and the recess 42*a* are continuous with each other at a position where the portions of the electrode layers 40*a* and 40*b* constituting the main surface electrode portion 41 and the portions of the electrode layers 40*a* and 40*b* constituting the side surface electrode portion 42 are connected to each other. The recesses 41*a* may be formed, for example, in the electrode layer 40*a* or the electrode layer 40*b*. The recesses 42*a* may be formed, for example, in the electrode layer 40*a* or the electrode layer 40*b*.

In the multilayer coil component 1, the plated layer 6 is in contact with the surface 41*b* of the underlying metal layer 40 included in the main surface electrode portion 41. The plated layer 6 is in contact with each surface of the plurality of the recesses 41*a*. Therefore, a contact area between the plated layer 6 and the underlying metal layer 40 in the multilayer coil component 1 is larger than a contact area between the plated layer and the underlying metal layer in a configuration in which the recesses 41*a* are not formed in the underlying metal layer 40. Therefore, the multilayer coil component 1 improves bonding strength between the underlying metal layer 40 and the plated layer 6.

In the multilayer coil component 1, the longitudinal direction at the opening of each recess 41*a* is the direction in which the pair of external electrodes 4 are separated from each other. The direction in which the pair of external electrodes 4 are separated from each other is, for example, the direction D2.

In the multilayer coil component 1, the plated layer 6 includes a portion in contact with each surface of the plurality of recesses 41*a* of which the longitudinal direction is the direction in which the pair of external electrodes 4 are separated from each other. The longitudinal direction of this portion is the direction in which the pair of external electrodes 4 are separated from each other. Therefore, in the multilayer coil component 1, the bonding strength between the underlying metal layer 40 and the plated layer 6 is further improved in a direction which intersects with the direction in which the pair of external electrodes 4 are separated from each other and is along the one main surface 2*b*.

In the multilayer coil component 1, the element body 2 includes the pair of side surfaces 2*a*. Each of the pair of external electrodes 4 includes the side surface electrode portion 42. The plurality of recesses 42*a* are formed in the underlying metal layer 40 included in each side surface electrode portion 42.

In the multilayer coil component 1, the plated layer 6 is in contact with each surface of the plurality of recesses 41*a* and is in contact with each surface of the plurality of recesses 42*a*. The contact area between the plated layer 6 and the underlying metal layer 40 in the multilayer coil component 1 is larger than a contact area between the plated layer 6 and the underlying metal layer 40 in a configuration in which the recesses 42*a* are not formed in the underlying metal layer 40 included in the side surface electrode portion 42. Therefore, the multilayer coil component 1 further improves the bonding strength between the underlying metal layer 40 and the plated layer 6.

In the multilayer coil component 1, the longitudinal direction at the opening of each recess 42*a* is a direction orthogonal to the main surface 2*b*. The direction orthogonal to the main surface 2*b* is, for example, the direction D1.

In the multilayer coil component 1, the plated layer 6 includes the portion in contact with each surface of the plurality of recesses 42*a* of which the longitudinal direction is the direction orthogonal to the main surface 2*b*. The longitudinal direction of this portion is the direction orthogonal to the main surface 2*b*. Therefore, the multilayer coil component 1 further improves the bonding strength between the underlying metal layer 40 and the plated layer 6 in the direction along the main surface 2*b*.

In the multilayer coil component 1, the main surface electrode portion 41 and the side surface electrode portion 42 are integrally formed with each other. The recess 41*a* and the recess 42*a* are continuous with each other.

In the multilayer coil component 1, the plated layer 6 in contact with the main surface electrode portion 41 and the plated layer 6 in contact with the side surface electrode portion 42 are continuous with each other. In the multilayer coil component 1, the plated layer 6 is tends not to peel off from the underlying metal layer 40 as compared with a configuration in which the plated layer in contact with the main surface electrode portion 41 and the plated layer in contact with the side surface electrode portion 42 are not continuous with each other. Therefore, the multilayer coil component 1 further improves the bonding strength between the underlying metal layer 40 and the plated layer 6.

In the multilayer coil component 1, the plurality of recesses 41*a* are formed in the underlying metal layer 40.

The contact area between the plated layer 6 and the underlying metal layer 40 in the multilayer coil component 1 is larger than a contact area between the plated layer 6 and the underlying metal layer 40 in a configuration in which only one recess 41*a* is formed in the underlying metal layer 40. Therefore, the multilayer coil component 1 further improves the bonding strength between the underlying metal layer 40 and the plated layer 6.

In the multilayer coil component 1, the plurality of recesses 42*a* are formed in the underlying metal layer 40.

The contact area between the plated layer 6 and the underlying metal layer 40 in the multilayer coil component 1 is larger than a contact area between the plated layer 6 and the underlying metal layer 40 in a configuration in which only one recess 42*a* is formed in the underlying metal layer 40. Therefore, the multilayer coil component 1 further improves the bonding strength between the underlying metal layer 40 and the plated layer 6.

In the multilayer coil component 1, the recess 61 is formed in the plated layer 6 at a position corresponding to each recess 41*a*.

In the multilayer coil component 1, when the multilayer coil component 1 is solder-mounted, surfaces of the recesses 61 and a solder come into contact with each other. A contact area between the plated layer 6 and the solder in the multilayer coil component 1 is larger than a contact area between the plated layer 6 and the solder in a configuration in which the recesses 61 are not formed in the plated layer 6. Therefore, the multilayer coil component 1 improves bonding strength between the plated layer 6 and the solder. Consequently, the multilayer coil component improves a mounting strength.

In the multilayer coil component 1, the recess 62 is formed in the plated layer 6 at a position corresponding to each recess 42*a*.

In the multilayer coil component 1, when the multilayer coil component 1 is solder-mounted, surfaces of the recesses 62 and a solder come into contact with each other. A contact area between the plated layer 6 and the solder in the multilayer coil component 1 is larger than a contact area between the plated layer 6 and the solder in a configuration in which the recesses 62 are not formed in the plated layer 6. Therefore, the multilayer coil component improves the bonding strength between the plated layer 6 and the solder. Consequently, the multilayer coil component improves the mounting strength.

In the multilayer coil component 1, the protrusions and the recesses that are in contact with the element body 2 are formed in the main surface electrode portion 41 and the side surface electrode portions 42.

A contact area between the element body 2 and the external electrode 4 in the multilayer coil component 1 is larger than a contact area between the element body 2 and the external electrode 4 in a configuration in which the protrusions and the recesses in contact with the element body 2 are not formed in the main surface electrode portion 41 and the side surface electrode portion 42. Therefore, the multilayer coil component 1 improves bonding strength between the element body 2 and the external electrode 4.

Figure 5:
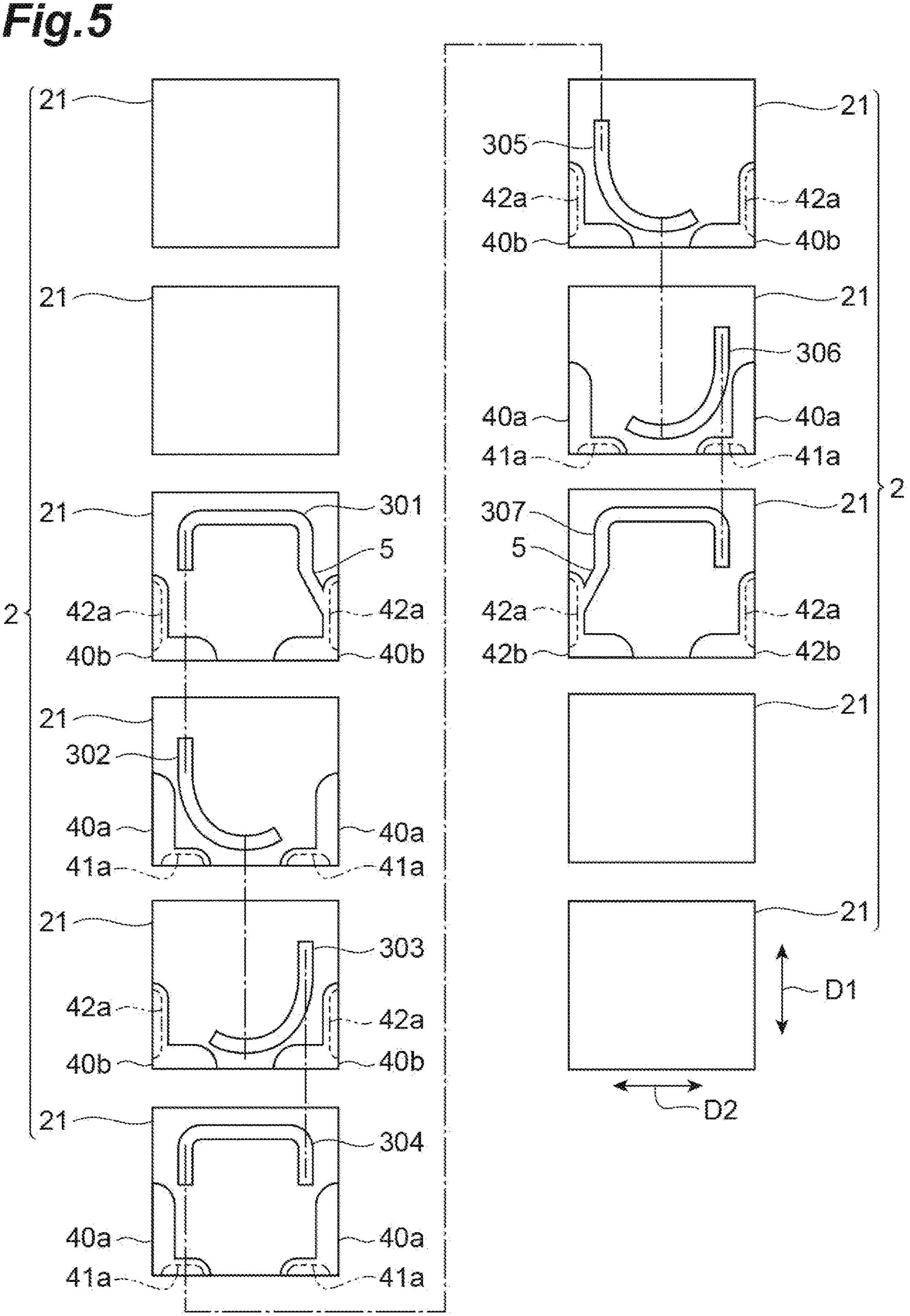
FIG. 5 is an exploded view illustrating a multilayer coil component according to another embodiment.

Next, a configuration of a multilayer coil component 1A according to another embodiment will be described with reference to FIGS. 5, 6A, and 6B. FIG. 5 is an exploded view illustrating the multilayer coil component 1A according to the other embodiment.

Figure 6A:
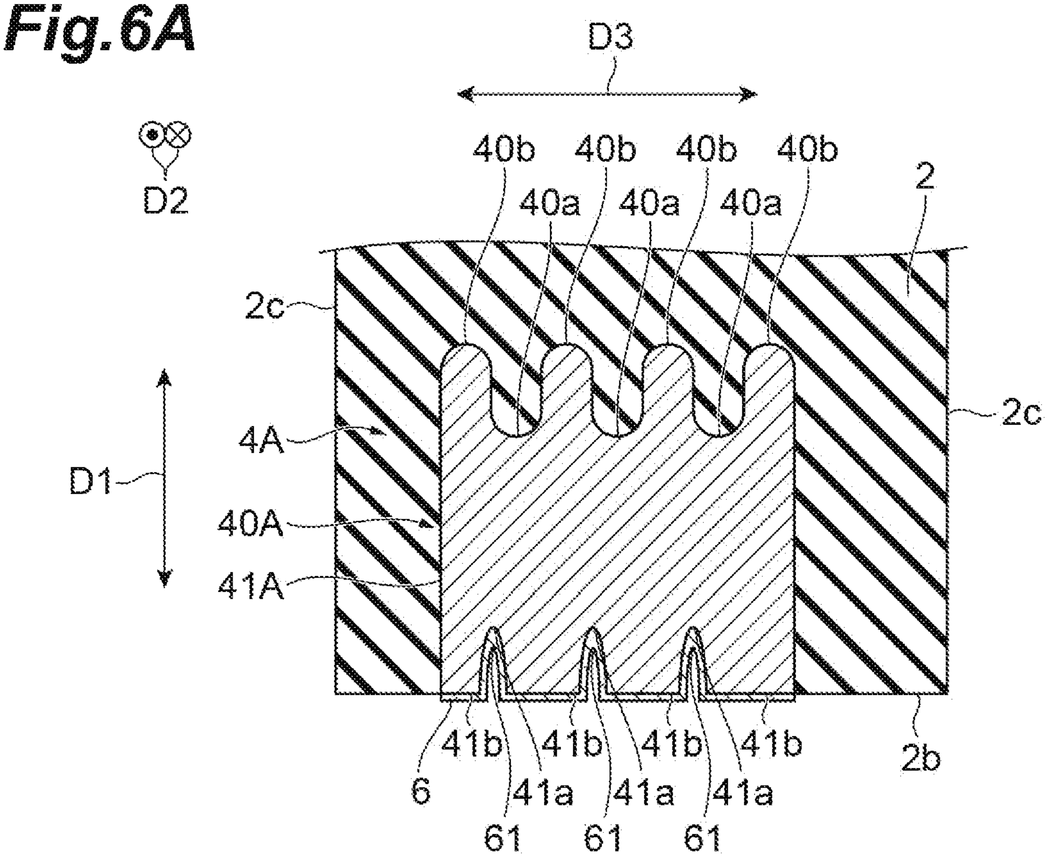
FIGS. 6A and 6B are views each illustrating a cross-sectional configuration of an external electrode.
Figure 6B:
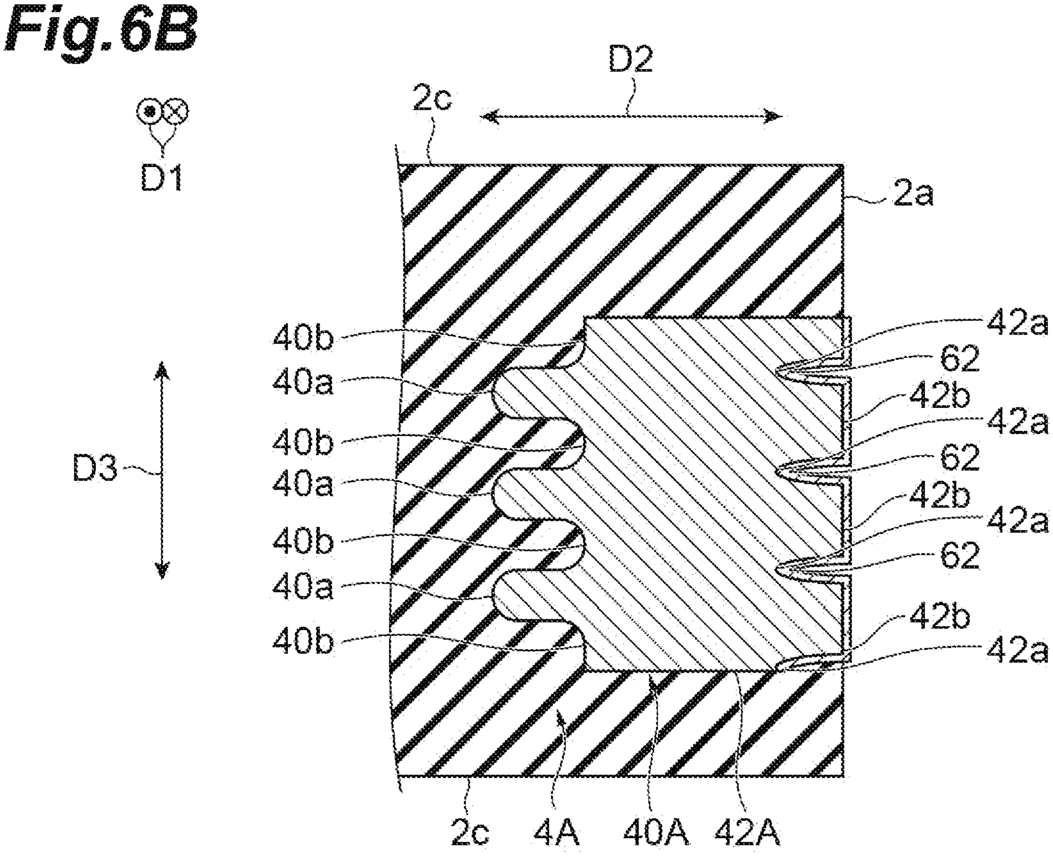

FIGS. 6A and 6B are views each illustrating a cross-sectional configuration of an external electrode. The multilayer coil component 1A includes a coil 3A and a pair of external electrodes 4A. The multilayer coil component 1A is generally similar to or the same as the multilayer coil component 1. However, the multilayer coil component 1A differs from the multilayer coil component 1 in, for example, a configuration of each of the coil 3A and the pair of external electrodes 4A. A difference between the multilayer coil component 1 and the multilayer coil component 1A will be mainly described below.

As illustrated in FIG. 5, in the multilayer coil component 1A, the number of the plurality of insulator layers 21 included in the element body 2 is "11." The coil 3A includes a plurality of coil conductors 301, 302, 303, 304, 305, 306, and 307. The number of the plurality of coil conductors 301 to 307 is "7." The coil 3A is configured through laminating seven conductor layers corresponding to the plurality of coil conductors 301 to 307. Each of the coil conductors 301 to 307 constitutes a part of an annular path in the coil 3A. Each of the coil conductors 301 to 307 has, for example, a shape in which a part of a loop is interrupted. Each of the coil conductors 301 to 307 extends from one end to the other end along the annular path. The coil 3A is constituted by the seven coil conductors 301 to 307 connected to each other in the direction D3. The number of turns of the coil 3A is 2.5 turns.

The coil conductor 301 in the coil 3A has a shape corresponding to that of the coil conductor 31 in the coil 3. Each of the coil conductors 302 and 305 in the coil 3A has a shape corresponding to that of the coil conductor 33 in the coil 3. Each of the coil conductors 303 and 306 in the coil 3A has a shape corresponding to that of the coil conductor 35 in the coil 3. The coil conductor 307 in the coil 3A has a shape corresponding to that of the coil conductor 37 in the coil 3.

The coil conductor 304 couples the coil conductor 303 and the coil conductor 305 to each other. The coil conductor 304 includes one end, another end, and a portion between the one end and the other end. The one end of the coil conductor 304 overlaps the coil conductor 303 and is connected to the coil conductor 303. The other end of the coil conductor 304 overlaps the coil conductor 305 and is connected to the coil conductor 305. The above-described portion of the coil conductor 304 extends in the direction D2.

Each of the pair of external electrodes 4A includes an underlying metal layer 40A disposed in the element body 2. Like the underlying metal layer 40, the underlying metal layer 40A includes a plurality of laminated electrode layers 40*a* and 40*b*. In the underlying metal layer 40A, the number of the plurality of electrode layers 40*a* is "3," and the number of the plurality of electrode layers 40*b* is "4." The total number of the plurality of electrode layers 40*a* and 40*b* is "7." Each of the pair of external electrodes 4A includes a main surface electrode portion 41A exposed from the one main surface 2*b* and a side surface electrode portion 42A exposed from the corresponding side surface 2*a* of the pair of side surfaces 2*a*. The main surface electrode portion 41A corresponds to the main surface electrode portion 41. The side surface electrode portion 42A corresponds to the side surface electrode portion 42.

The electrode layer 40*b* includes a portion that constitutes the main surface electrode portion 41A, and this portion protrudes toward the inside of the element body 2 more than the electrode layer 40*a* in the main surface electrode portion 41A. The electrode layer 40*a* includes a portion that constitutes the main surface electrode portion 41A, and this portion is recessed toward the one main surface 2*b* more than the electrode layer 40*b* in the main surface electrode portion 41A. The electrode layer 40*a* includes a portion that constitutes the side surface electrode portion 42A, and this portion protrudes toward the inside of the element body 2 more than the electrode layer 40*b* in the side surface electrode portion 42A. The electrode layer 40*b* includes a portion that constitutes the side surface electrode portion 42A, and this portion is recessed toward the corresponding side surface 2*a* more than the electrode layer 40*a* in the side surface electrode portion 42A.

In the underlying metal layer 40A, the plurality of electrode layers 40*a* and the plurality of electrode layers 40*b* are alternately positioned in the direction D3.

FIG. 6A is a view of a cross section obtained by cutting the main surface electrode portion 41A along a plane parallel to the side surface 2*a* in the direction D2. FIG. 6B is a view of a cross section obtained by cutting the side surface electrode portion 42A along a plane parallel to the main surface 2*b* in the direction D1. As illustrated in FIG. 6A, a plurality of recesses 41*a* that open to at least the surface 41*b* are formed in the underlying metal layer 40A included in the main surface electrode portion 41A. As illustrated in FIG. 6B, a plurality of recesses 42*a* that open to at least the surface 42*b* are formed in the underlying metal layer 40A included in the side surface electrode portion 42A.

As illustrated in FIG. 6A, the number of the plurality of recesses 41*a* formed in the main surface electrode portion 41A is "3." As illustrated in FIG. 6B, the number of the plurality of recesses 42*a* formed in the side surface electrode portion 42A is "4." Of the plurality of recesses 42*a*, the recess 42*a* positioned at one end in the direction D3 opens to the surface 42*b* and opens to a surface that is included in the side surface electrode portion 42A and is opposite to the side surface 2*c*. The recess 42*a* positioned at the one end in the direction D3 is formed to cut a corner of the side surface electrode portion 42A, and this corner is formed by a surface opposite to the side surface 2*c* and a surface opposite to the side surface 2*a*. The recess 42*a* positioned at the one end in the direction D3 is positioned in the element body 2.

As illustrated in FIG. 6A, a plurality of protrusions and a plurality of recesses that are in contact with the element body 2 are formed in the main surface electrode portion 41A. Each protrusion in contact with the element body 2 is configured by a corresponding electrode layer 40*b* of the plurality of electrode layers 40*b*. Each recess in contact with the element body 2 is configured by a corresponding electrode layer 40*a* of the plurality of electrode layers 40*a*. The plurality of protrusions and the plurality of recesses formed in the main surface electrode portion 41A are alternately positioned in the direction D3. In the direction D3, the protrusions configured by the electrode layers 40*b* are positioned at both ends of the main surface electrode portion 41A in the direction D3.

As illustrated in FIG. 6B, a plurality of protrusions and a plurality of recesses that are in contact with the element body 2 are formed in the side surface electrode portion 42A. Each protrusion in contact with the element body 2 is configured by a corresponding electrode layer 40*a* of the plurality of electrode layers 40*a*. Each recess in contact with the element body 2 is configured by a corresponding electrode layer 40*b* of the plurality of electrode layers 40*b*. The plurality of protrusions and the plurality of recesses formed in the side surface electrode portion 42A are alternately positioned in the direction D3. The recesses configured by the electrode layers 40*a* are positioned at both ends of the side surface electrode portion 42A in the direction D3.

Figure 7A:
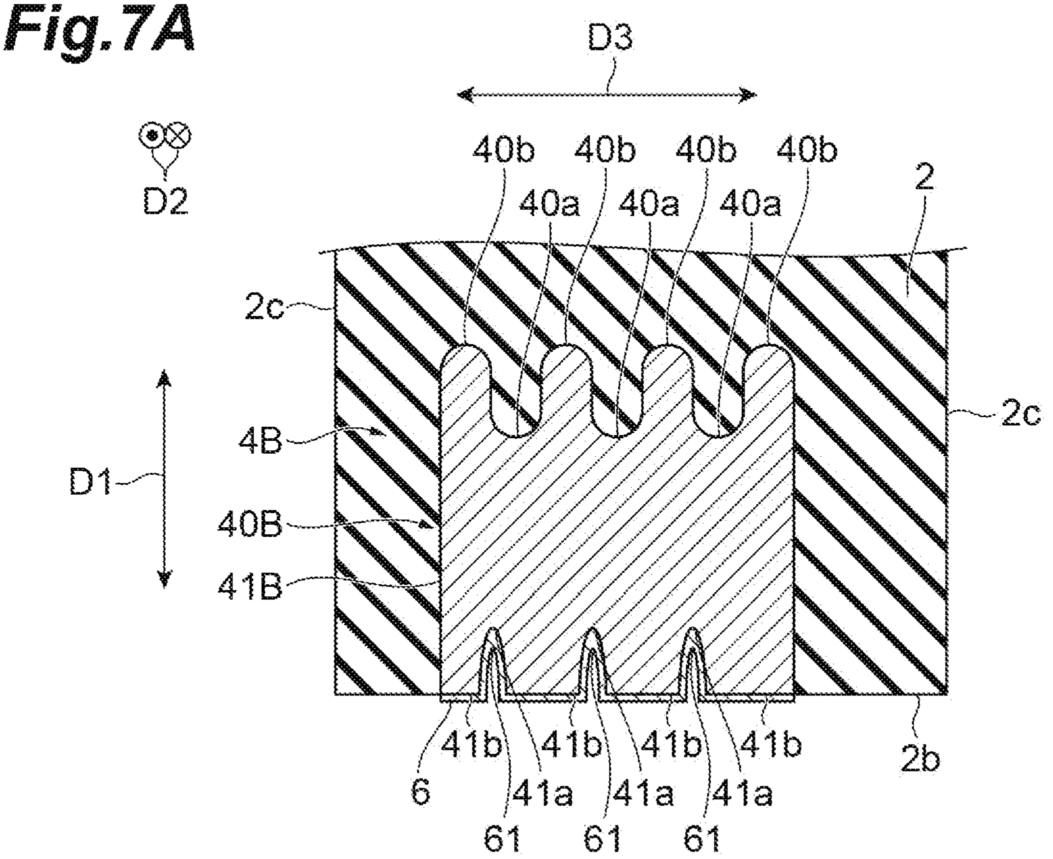
FIGS. 7A and 7B are views each illustrating a cross-sectional configuration of an external electrode.
Figure 7B:
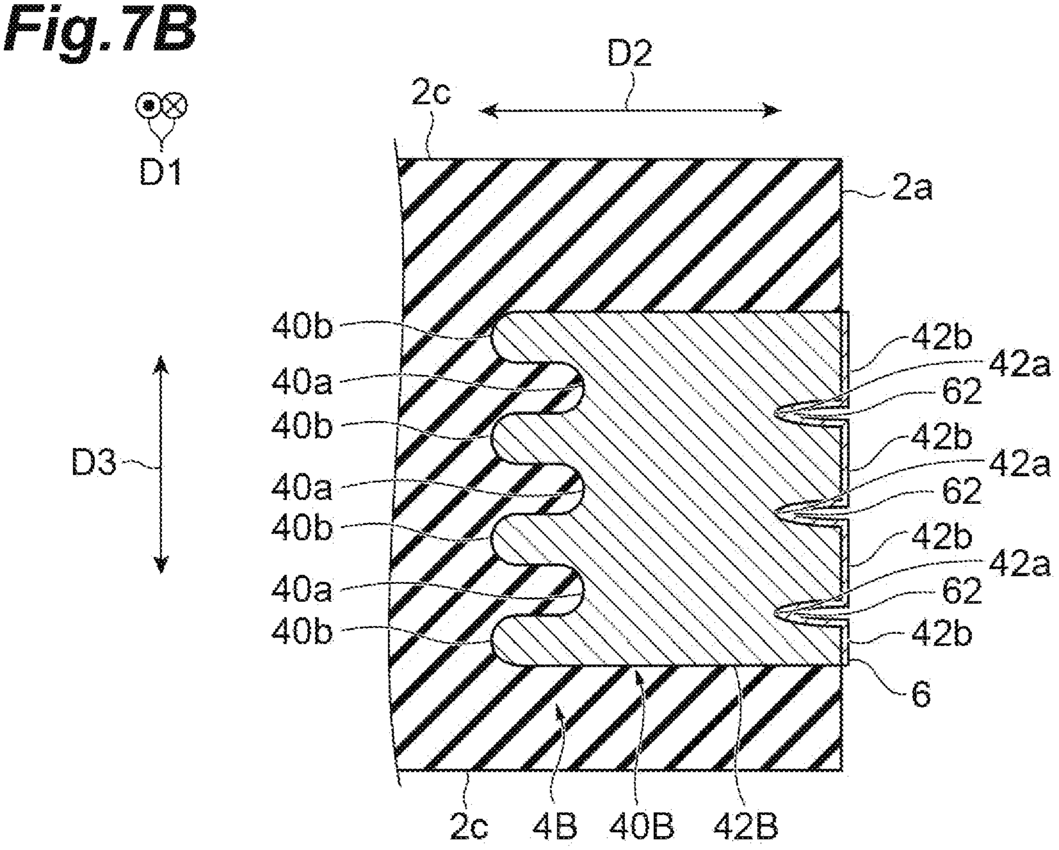

Next, a configuration of an external electrodes 4B will be described with reference to FIGS. 7A and 7B. The external electrode 4B is a modification of the external electrode 4A. FIGS. 7A and 7B are views each illustrating a cross-sectional configuration of the external electrode.

The multilayer coil component 1A includes, for example, a pair of external electrodes 4B instead of the pair of external electrodes 4A. Each of the pair of external electrodes 4B includes an underlying metal layer 40B disposed in the element body 2. Like the underlying metal layer s 40 and 40A, the underlying metal layer 40B includes a plurality of laminated electrode layers 40*a* and 40*b*. Each of the pair of external electrodes 4B includes a main surface electrode portion 41B exposed from the one main surface 2*b* and a side surface electrode portion 42B exposed from the corresponding side surface 2*a* of the pair of side surfaces 2*a*. The main surface electrode portion 41B corresponds to the main surface electrode portion 41. The side surface electrode portion 42B corresponds to the side surface electrode portion 42. FIG. 7A is a view of a cross section obtained by cutting the main surface electrode portion 41B along a plane parallel to the side surface 2*a* in the direction D2. FIG. 7B is a view of a cross section obtained by cutting the side surface electrode portion 42B along a plane parallel to the main surface 2*b* in the direction D1.

A plurality of recesses 41*a* that open to at least the surface 41*b* are formed in the underlying metal layer 40B included in the main surface electrode portion 41B. As illustrated in FIG. 7A, the number of the plurality of recesses 41*a* formed in the main surface electrode portion 41B is "3." A plurality of recesses 42*a* that open to at least the surface 42*b* are formed in the underlying metal layer 40B included in the side surface electrode portion 42B. As illustrated in FIG. 7B, the number of the plurality of recesses 42*a* formed in the side surface electrode portion 42B is "3."

The electrode layer 40*b* includes a portion that constitutes the main surface electrode portion 41B, and this portion protrudes toward the inside of the element body 2 more than the electrode layer 40*a* in the main surface electrode portion 41B. The electrode layer 40*b* includes a portion that constitutes the side surface electrode portion 42B, and this portion protrudes toward the inside of the element body 2 more than the electrode layer 40*a* in the side surface electrode portion 42B. The electrode layer 40*a* includes a portion that constitutes the main surface electrode portion 41B, and this portion is recessed toward the one main surface 2*b* more than the electrode layer 40*b* in the main surface electrode portion 41B. The electrode layer 40*a* includes a portion that constitutes the side surface electrode portion 42B, and this portion is recessed toward the corresponding side surface 2*a* more than the electrode layer 40*b* in the side surface electrode portion 42B.

In the underlying metal layer 40B, the plurality of electrode layers 40*b* and the plurality of electrode layers 40*a* are alternately positioned. The protrusions configured by the electrode layer 40*b* are positioned at both ends of the main surface electrode portion 41B in the direction D3. The protrusions configured by the electrode layer 40*b* are positioned at both ends of the side surface electrode portion 42B in the direction D3.

Figure 8:
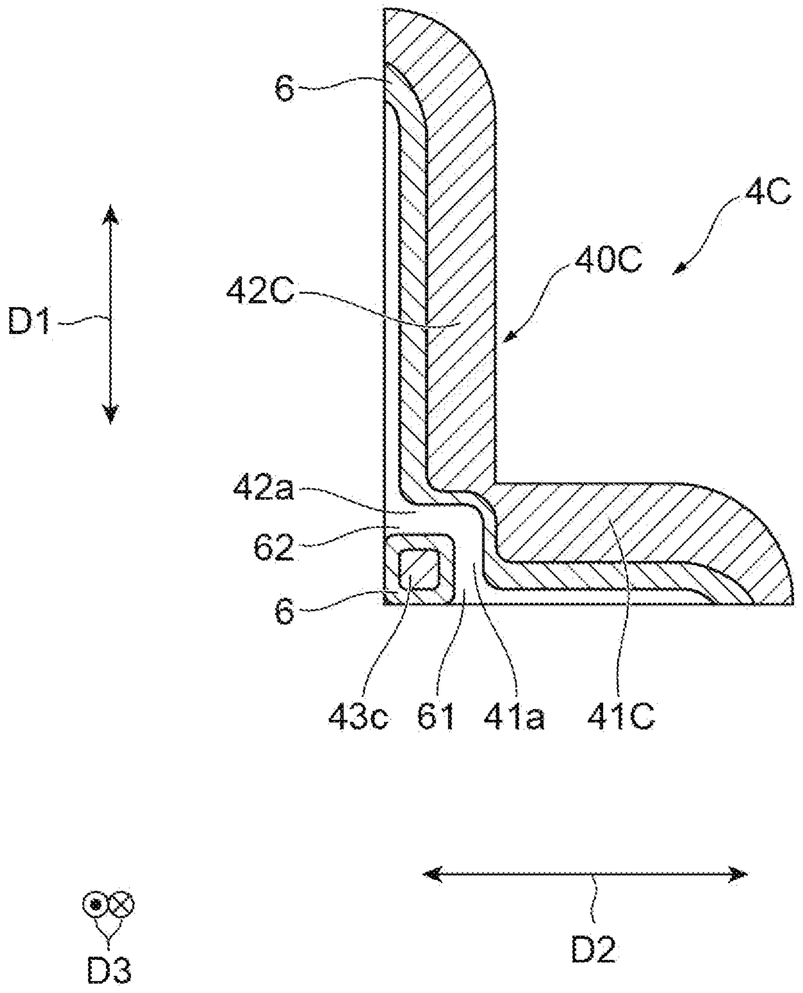
FIG. 8 is a view illustrating a cross-sectional configuration of an external electrode.

Next, a configuration of an external electrodes 4C will be described with reference to FIG. 8. The external electrode 4C is a modification of the external electrode 4. FIG. 8 is a view illustrating a cross-sectional configuration of the external electrode.

The multilayer coil component 1 includes, for example, a pair of external electrodes 4C instead of the pair of external electrodes 4. Each of the pair of external electrodes 4C includes an underlying metal layer 40*c* disposed on the element body 2. Each of the pair of external electrodes 4C includes a main surface electrode portion 41C exposed from the main surface 2*b* and a side surface electrode portion 42C exposed from the side surfaces 2*a*. FIG. 8 is a view of a cross section obtained by cutting the external electrode 4C along a plane parallel to the side surface 2*c* in the direction D3. The underlying metal layer 40C includes, for example, a plurality of laminated electrode layers 40*a* and 40*b*.

In the external electrode 4C, the underlying metal layer 40C includes a portion 43*c*, at which a recess 41*a* and a recess 42*a* corresponding to each other are not continuous, at a position corresponding to a ridge portion of the element body 2. The recess 41*a* and the recess 42*a* corresponding to each other communicate with each other inside the underlying metal layer 40C. Plated layers 6 formed in the recess 41*a* and the recess 42*a* corresponding to each other are continuous with each other inside the underlying metal layer 40C. A recess 61 and a recess 62 are not continuous at the position corresponding to the ridge portion of the element body 2. The recess 61 and the recess 62 communicate with each other inside the underlying metal layer 40C. The recess 61 and the recess 62 may not communicate with each other inside the underlying metal layer 40C. The plated layer 6 may be formed to fill the recess 41*a* and the recess 42*a* communicating with each other inside the underlying metal layer 40C. In this case, the recesses 61 and 62 may not be formed in the plated layer 6.

Although the embodiment and modifications of the present disclosure have been described above, the present disclosure is not necessarily limited to the embodiment and modifications, and the embodiment can be variously changed without departing from the scope of the disclosure.

Each recess 41*a* may include, for example, only one groove extending in the direction D2, or may include a plurality of grooves that are discontinuous in the direction D2. Each recess 42*a* may include, for example, only one groove extending in the direction D1, or may include a plurality of grooves that are discontinuous in the direction D1.

Each recess 61 may include, for example, only one groove extending in the direction D2, or may include a plurality of grooves that are discontinuous in the direction D2. Each recess 62 may include, for example, only one groove extending in the direction D1, or may include a plurality of grooves that are discontinuous in the direction D1.

The recess 61 may not be formed in the plated layer 6. In this case, the plated layer 6 may be formed to fill each recess 41*a*. A configuration in which the recess 61 is formed in the plated layer 6 improves mounting strength of the multilayer coil component 1 as described above. The recess 62 may not be formed in the plated layer 6. In this case, the plated layer 6 may be formed to fill each recess 42*a*. A configuration in which the recess 62 is formed in the plated layer 6 improves mounting strength of the multilayer coil component 1 as described above.

What is claimed is:

1. A multilayer coil component comprising:

an element body including a main surface arranged to constitute a mounting surface;

a coil disposed in the element body; and a pair of external electrodes electrically connected to the coil and each including an underlying metal layer disposed on the element body and a plated layer in contact with a surface of the underlying metal layer, wherein each of the pair of external electrodes includes a main surface electrode portion that is disposed in a recess defined in the main surface of the element body and that is exposed at the main surface, wherein at least one recess that opens to at least the surface of the underlying metal layer is formed in the underlying metal layer included in each main surface electrode portion, wherein the element body includes a plurality of laminated insulator layers, and wherein the underlying metal layer includes a plurality of laminated electrode layers, and the at least one recess is formed between two of the plurality of laminated electrode layers, the plurality of laminated electrode layers having the same lamination direction as a lamination direction that the plurality of laminated insulating layers have.

2. The multilayer coil component according to claim 1, wherein the pair of external electrodes are separated from each other, and wherein a longitudinal direction at an opening of the at least one recess is a direction in which the pair of external electrodes are separated from each other.

3. The multilayer coil component according to claim 1, wherein the element body further includes a pair of side surfaces opposing each other and adjacent to the main surface, wherein each of the pair of external electrodes includes a side surface electrode portion exposed from a corresponding side surface of the pair of side surfaces, and wherein at least one recess that opens to at least the surface is formed in the underlying metal layer included in each side surface electrode portion.

4. The multilayer coil component according to claim 3, wherein a longitudinal direction of an opening of the at least one recess formed in the underlying metal layer included in each side surface electrode portion is a direction orthogonal to the main surface.

5. The multilayer coil component according to claim 3, wherein the main surface electrode portion and the side surface electrode portion are integrally formed with each other, and wherein the at least one recess formed in the underlying metal layer included in the main surface electrode portion and the at least one recess formed in the underlying metal layer included in the side surface electrode portion are continuous with each other.

6. The multilayer coil component according to claim 1, wherein the at least one recess includes a plurality of recesses.

7. The multilayer coil component according to claim 1, wherein a recess is formed in the plated layer at a position corresponding to the at least one recess.

8. A multilayer coil component comprising:

an element body including a main surface arranged to constitute a mounting surface;

a coil disposed in the element body; and a pair of external electrodes electrically connected to the coil and each including an underlying metal layer disposed on the element body and a plated layer in contact with a surface of the underlying metal layer, wherein the underlying metal layer includes a main surface electrode portion that is disposed in a recess defined in the main surface of the element body and that is exposed at the main surface, wherein at least one recess that opens to at least a surface of the main surface electrode portion is formed in each main surface electrode portion, wherein the element body includes a plurality of laminated insulator layers, and wherein the underlying metal layer includes a plurality of laminated electrode layers, and the at least one recess is formed between two of the plurality of laminated electrode layers, the plurality of laminated electrode layers having the same lamination direction as a lamination direction that the plurality of laminated insulating layers have.

9. The multilayer coil component according to claim 8, wherein the pair of external electrodes are separated from each other, and wherein an opening of the at least one recess includes a longitudinal direction in a direction in which the pair of external electrodes are separated from each other.

10. The multilayer coil component according to claim 8, wherein the element body further includes a pair of side surfaces opposing each other and adjacent to the main surface, wherein each underlying metal layer includes a side surface electrode portion exposed from a corresponding side surface of the pair of side surfaces, and wherein at least one recess that opens to at least a surface of the side surface electrode portion is formed in each side surface electrode portion.

11. The multilayer coil component according to claim 10, wherein an opening of the at least one recess formed in each side surface electrode portion includes a longitudinal direction in a direction orthogonal to the main surface.

12. The multilayer coil component according to claim 10, wherein the side surface electrode portion is integrated with the main surface electrode portion, and wherein the at least one recess formed in the side surface electrode portion is continuous with the at least one recess formed in the main surface electrode portion.

13. The multilayer coil component according to claim 10, wherein the at least one recess formed in the side surface electrode portion includes a plurality of recesses.

14. The multilayer coil component according to claim 10, wherein a recess is formed in the plated layer at a position corresponding to the at least one recess formed in the side surface electrode portion.

15. The multilayer coil component according to claim 8, wherein the at least one recess formed in the main surface electrode portion includes a plurality of recesses.

16. The multilayer coil component according to claim 8, wherein a recess is formed in the plated layer at a position corresponding to the at least one recess formed in the main surface electrode portion.

17. The multilayer coil component according to claim 1, wherein the element body further includes a pair of side surfaces opposing each other and adjacent to the main surface, and wherein the underlying metal layer includes a protrusion disposed on a side opposite to which the at least one recess is formed on.

18. The multilayer coil component according to claim 8, wherein the element body further includes a pair of side surfaces opposing each other and adjacent to the main surface, and wherein the underlying metal layer includes a protrusion disposed on a side opposite to which the at least one recess is formed on.

19. The multilayer coil component according to claim 1, wherein the at least one recess has a depth larger than a width of the at least one recess.

20. The multilayer coil component according to claim 8, wherein the at least one recess has a depth larger than a width of the at least one recess.

* * * * *